United States Patent Office 3,480,710
Patented Nov. 25, 1969

3,480,710
PROCESS FOR THE CONTROL OF BOLL WEEVIL AND BOLL WORM WITH TDE AND MALATHION
Gordon S. Batchelor, Mountain Lakes, and Edwin F. Hawkins, Morristown, N.J., assignors to Allied Chemical Corporation, New York, N.Y., a corporation of New York
No Drawing. Filed June 21, 1967, Ser. No. 647,616
Int. Cl. A01n 9/36, 9/34, 17/00
U.S. Cl. 424—213      15 Claims

ABSTRACT OF THE DISCLOSURE

A process of combatting boll weevil and boll worm by spraying the cotton crop with 1,1-dichloro-2,2 bis parachlorophenyl ethane, commonly known as TDE, dissolved in xylol or cyclohexanone or both and combined with malathion.

BACKGROUND OF THE INVENTION

This invention relates to a process of controlling insect pests infesting cotton and, more particularly, to a process of simultaneously controlling the two major cotton pests, namely cotton boll weevil, *Anthonomus grandis*, and the cotton boll worm, *Heliothis zea* by the spray of applications of TDE and a mixture of TDE and malathion.

Cotton is a major crop in many areas of the country, and the control of insects destructive or injurious to cotton plants is essential if the growing of cotton is to survive and be profitable.

For many years, a variety of insecticides have been applied to the cotton plant to control one or another of the major cotton pests. Usually such insecticides have been applied as specially formulated solid dusts or aqueous emulsion sprays. Such dusts or sprays frequently contained a mixture of toxicants designed to control several cotton pests when such toxicants were compatible.

In recent years aerial applications of dusts and sprays have become common, said aerial spray applications being made at rates from 1 to 3 gallons total volume per acre of dilute aqueous emulsions to apply a total of about 6–8 pounds of active toxicants per acre.

Aerial spraying, as by atomized application from airplanes, was expensive in requiring application of large volumes of diluent, usually water, to apply small amounts of toxicant.

The recent development of a new type of spray nozzle, equipped with flat spray tips, and called the "Mini-Spin" nozzle (described in "Farm Technology" for April 1965, pp. 9 and 10), has permitted the undiluted spray application of low volumes of certain low viscosity liquid insecticides whereby application rates are reduced as much as 90% or more.

In the "Mini-Spin" nozzle, as in others of a similar type, the liquid toxicant is delivered to a circular fine mesh screen cage about two inches in diameter which is propeller driven. The spray droplets are thrown by centrifugal force through the screen and are atomized in droplets of between about 50 microns and about 100 microns in size. These sprays of droplets are preferably applied from a height of not more than about 20 feet above the cotton plants, preferably between about 5 feet and about 10 feet. Application may be made either by airplane or by ground rigs. For adequate coverage, between about 50 droplets and about 500 droplets of the above size range should be applied per inch.

Particularly adapted for application in this manner, is the pesticide known as malathion, which is chemically, O,O-dimethyl phosphorodithioate of diethyl mercaptosuccinate.

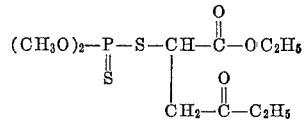

This material is a very low viscosity liquid, of the order of about 45 centipoises at 20° C., and has found wide use by means of the new technique in controlling boll weevil in large cotton plantings. However, it is ineffective in controlling boll worm infestations at low concentrations. Thus, if complete protection of the cotton crop is to be effected, a second spraying of a boll worm toxicant must be made by the old, high volume spray application.

Application of the major known boll worm toxicants by the new method is not feasible since the best of such compounds are either solids like TDE (1,1-dichloro-2,2-bis (parachlorophenyl) ethane), DDT, dichlorodiphenyltrichloroethane), and Sevin (1-naphthyl-N-methyl carbamate) or viscous liquids such as Strobane (polychlorinated terpenes), and Toxaphene (chlorinated camphene). All of the above compounds have such low solubilities in common solvents that they cannot feasibly be used in the new low volume spray applications. Moreover, solvents such as acetone, methyl ethyl ketone, benzene, toluene and dioxane all have flash points below about 12° C. and so would pose an explosive hazard if compositions containing them were sprayed into the atmosphere. Further, solvents such as kerosene and the lower alkanes as well as xylene have low solubilizing power for the above-named insecticides, and all except *xylol* and *cyclohexanone* have vapor pressures so high as to be unsuitable, since evaporation on atomization would so reduce the size of the droplets that excessive drift and unsatisfactory coverage of the cotton plant would result.

It is an object of this invention to produce homogeneous liquid solutions of TDE.

It is an additional object of this invention to produce homogeneous liquid solutions of TDE and malathion.

It is a further object of this invention to produce homogeneous liquid solutions of TDE and malathio suitable for low volume aerial spraying.

SUMMARY OF THE INVENTION

In accordance with the present invention a solution of the insecticide TDE in cyclohexanone or xylol or in a mixture of cyclohexanone and xylol is formed. The solution may then be mixed with malathion to form a homogeneous solution. In this manner the following solutions of the present invention may be formed:

(a) 1–6 pounds of TDE per gallon of cyclohexanone;
(b) 4/1 to 3/6 pounds of TDE/malathion per gallon (U.S.) of a mixture of xylol and cyclohexanone;
(c) 3/1 to 2/4 pounds of TDE/malathion per gallon of xylol; and
(d) 3/1.5 to 4/4 pounds of TDE/malathion per gallon of cyclohexanone.

This invention also includes the aerial or mechanical spraying of the above solutions on cotton crops so as to combat boll weevil and boll worm by spraying 0.2–6.0 pounds of the toxicants TDE or TDE and malathion per acre of cotton.

It has been discovered that TDE (1,1-dichloro-2,2-bis (parachlorophenyl) ethane), an effective solid boll worm toxicant, can be dissolved in cyclohexane or xylol and the resulting solution has fluidity and vapor pressure characteristics adapted for low volume aerial spray application. Generally 1–6 and preferably 3–6 pounds of TDE per (U.S.) gallon of solvent, xylol or cyclohexanone, may be used to make up a homogeneous solution having the required fluidity and vapor pressure characteristics. Outside of these ranges of concentrations either the solution does not have the required fluidity and vapor pressure or the concentration of the TDE is not high enough so that the toxicant is effective against the boll worm.

Furthermore, a homogeneous, liquid blend of the boll weevil toxicant, malathion, and TDE can be prepared having fluidity and vapor pressure characteristics adapted for low volume aerial spray application by mixing generally 3/1.5 pounds of TDE and malathion to 4/4 pounds of TDE and malathion per gallon of cyclohexanone solvent. The preferable concentration is 3/3–4/4 pounds of TDE and malathion per gallon of cyclohexanone.

Another homogeneous blend having the desirable properties may be formed by dissolving generally 3/1 pounds of TDE/malathion to 2/4 pounds of TDE/malathion per gallon of xylol. The preferable concentrations are 1/4 to 2/4 pounds of TDE/malathion per gallon of xylol.

An additional homogeneous blend having the desirable properties may be formed by generally mixing 4/1 pounds of TDE/malathion to 3/6 pounds of TDE/malathion per gallon of a mixture of cyclohexanone and xylol. Generally the weight percent of cyclohexanone in the cyclohexanone and xylol solution mixture may vary from 5–50% and preferably from 8–25%. The preferable concentration range of TDE/malathion is 4/2 to 4/4 pounds per gallon of solvent mixture (cyclohexanone and xylol).

The TDE, malathion solutions are formed by dissolving the required amount of TDE in the solvent (cyclohexanone, xylol or a mixture of cyclohexanone and xylol) and then adding to this the required amount of malathion. Malathion at 95% purity, technical grade was found satisfactory for these purposes.

While the percentages of the several components can be varied somewhat, substantial deviation from the proportions indicated produces a less satisfactory composition. Adding larger proportions of cyclohexanone would not only dilute the high toxicant ratio but would also tend to reduce the droplet size produced in the atomization process, thus increasing drift and reducing coverage. Smaller proportions of cyclohexanone would fail to dissolve sufficient TDE and would reduce the compatibility of the malathion with the TDE solution.

DESCRIPTION OF THE PREFERRED EMBODIMENTS

Using the above method the following solutions were prepared as listed in Table I.

TABLE I

| Compounds | Concentrations (lbs.) | Per Gallon (U.S.) of Solvent |
| --- | --- | --- |
| TDE | 4 | 15% cyclohexanone and 85% xylol. |
| TDE | 6 | Do. |
| TDE/malathion | 3/1.5 | Cyclohexanone. |
| Do | 4/2 | Do. |
| Do | 4/4 | Do. |
| Do | 2/2 | Xylol. |
| Do | 3/1.5 | Do. |
| Do | 3/1 | Do. |
| Do | 2/4 | Do. |
| Do | 4/2 | 12.0% cyclohexanone and 88% xylol. |
| Do | 4/1 | 50.0% cyclohexanone and 50% xylol. |
| Do | 3/3 | 10.0% cyclohexanone and 90% xylol. |
| Do | 3/5 | Do. |
| Do | 3/6 | Do. |

The properties of a few of the above compounds were evaluated and are listed in Table II in comparison with the properties of technical grade, 95% malathion.

Low volume applications of the above TDE and malathion solution to cotton crops is possible with the new type of spray nozzles such as the "Mini-Spin" nozzle. When the solutions of the present invention are sprayed over cotton fields in droplets of average diameter between about 50 microns and about 100 microns at the rate of generally 0.2–6.0 pounds per acre and preferably 0.5–1.5 pounds of toxicant per acre adequate control of both boll weevil and boll worm is obtained in a single spray application.

The tests below illustrate the aerial application of the solution of 4/4 pounds of TDE/malathion per gallon of cyclohexanone solvent to a cotton field for the control of boll weevil and boll worm in comparison to the other toxicants used for the same purpose. The tests are intended to be illustrative and exemplary in character, only, and are not to be considered as limiting the invention in any way.

TEST I

Twelve, 12-acre plots 320 feet wide and approximately 1600 feet long were utilized to compare three low-volume aerial spray treatments with a standard emulsion spray treatment for effectiveness in controlling a boll worm, *Heliothis zea* Boddie, infestation in a field of cotton. Plots were arranged in randomized blocks with three replications of each of the four treatments. Two additional unreplicated low-volume treatment plots of 18 and 24 acres each were set up in the same field and a third was situated on a 24-acre plot in an adjacent field. Low-volume materials were applied at rates from 16 to 42 fluid ounces per acre with Mini-Spin nozzles. The airplane was flown at altitudes of 10 to 15 feet above the cotton to provide swath widths of 80 feet. The standard emulsion spray was applied at the rate of 2 gallons per acre just above the cotton, covering 40-feet swaths.

Toxaphene-DDT-methyl parathion and Strobane-DDT-malathion, both formulated with 6.0, 3.0 and 1.5 pounds of the three active ingredients per gallon and applied at the rate of 42 fluid ounces per acre, were equivalent in dosage to the standard emulsion spray which was one-half gallon of Toxaphene-DDT-methyl parathion (4–2–1) applied in water at the rate of 2 gallons per acre (2 pounds Toxaphene, 1 pound DDT and .5 pound methyl parathion per acre). The other replicated low-volume treatment was 95 percent malathion applied at the rate of 24 fluid ounces per acre, approximately 1.9 pounds active ingredient per acre. The 24-acre unreplicated plot in the same field was treated with a low-volume mixture containing 4 pounds of malathion and 4 pounds of TDE per gallon of cyclohexanone at the rate of 32 fluid ounces per acre while the 18 acre plot was treated with 16 ounces per acre of a low-volume formulation of Azodrin containing 4.8 pounds active ingredient per gallon. This gave a dosage rate of 1.0–1.0 pound of actual toxicant per acre for malathion-TDE and .6 pound per acre for Azodrin. The 24-acre plot in the adjacent field which had a different cultivation and insecticide-treatment history received 32 fluid ounces per acre of a 4 pounds per gallon emulsifiable methyl parathion formulation without water for the first 2 applications and 24 fluid ounces of 80 percent methyl parathion (8 pounds per gallon) thereafter. This raised the dosage from 1.0 to 1.5 pounds per acre.

The results of the test are listed in Table III. All treat-

TABLE II

| Compounds | Concentration | Specific Gravity, 20° C. | Lbs./gal. | Brookfield Viscosity | | Surface Tension, dynes/cm. |
| --- | --- | --- | --- | --- | --- | --- |
| | | | | 20° C. | 0° C. | |
| TDE/malathion | 4/4 lbs. per gallon of cyclohexanone | 1.2221 | 10.19 | 38 | 94 | 38.2 |
| TDE | 6 lbs. per gallon of 15% cyclohexanone and 85% xylol | 1.1774 | 9.80 | 31 | 53 | 39.0 |
| Malathion | 95% | 1.2239 | 10.21 | 45 | 126 | 38.1 | ments except low-volume methyl parathion resulted in adequate control of a serious boll worm infestation. Toxaphene-DDT-methyl parathion, and Strobane-DDT-malathion in low-volume applications did not differ significantly from the equivalent dosage of conventional water emulsion spray in control of this boll worm infestation. Also, malathion at 24 fluid ounces per acre did not differ significantly from the standard. The malathion-TDE and Azodrin treatments in the same field seemed to be comparable in effectiveness to the replicated treatments. Boll damage by boll worms was definitely greater in the portion of the adjacent field treated with low-volume applications of methyl parathion. Increasing the dosage of methyl parathion from 1.0 to 1.5 pounds per acre did not improve control.

per acre and the total volume of Toxaphene plus DDT plus methyl parathion water mixture was 2 gallons per acre. The first 3 applications of malathion plus TDE were applied in 75 foot swath widths from a height of approximately 15 feet and the last 8 were applied in 37.5 foot swath widths from a height of approximately 3 feet. All applications of Toxaphene plus DDT plus methyl parathion were applied in 37.5 foot swath widths from a height of approximately 3 feet. Results are listed in Table IV.

TABLE IV.—EFFECTIVENESS OF "MALATHION/TDE/CYCLOHEXANONE" SPRAY AGEINST BOLL WEEVILS AND BOLL WORMS IN FIELD COMPARED WITH STANDARD AQUEOUS EMULSION SPRAY

|  | Control, No Treatment | Malathion TDE in Cyclohexanone | Toxaphene, DDT Methyl Parathion in Aqueous Emulsion |
|---|---|---|---|
| Pounds Toxicant per Acre | 0 | 1+1=2 | 2.4+1.2+0.6=4.2 |
| Boll Weevil Infestation. Percent Punctured Squares: |  |  |  |
| (a) Before treatment | 1.3 | 0 | 0 |
| (b) After treatment | 23.8 | 5.8 | 4.0 |
| Boll Worm Eggs per 100 Terminals: |  |  |  |
| (a) Before treatment | 1.1 | 3.7 | 3.2 |
| (b) After treatment | 7.3 | 12.5 | 13.2 |
| Boll Worm Larvae per 100 Terminals: |  |  |  |
| (a) Before treatment | 20.0 | 21.3 | 23.7 |
| (b) After treatment | 11.9 | 9.6 | 4.0 |
| Boll Worm Square Injury, percent: |  |  |  |
| (a) Before treatment | 30.4 | 25.2 | 24.3 |
| (b) After treatment | 11.3 | 7.3 | 4.4 |
| Boll Worm Boll Injury, percent: |  |  |  |
| (a) Before treatment | 34.9 | 31.2 | 34.4 |
| (b) After treatment | 9.6 | 6.1 | 3.8 |
| Yield in Pounds of Seed Cotton per Acre | 530 | 1,603 | 1,631 |
| Gain over Control |  | 1,073 | 1,101 |

It can be seen from Table IV that the insecticides gave about equally good control of a heavy boll worm infestation. Both reduced the boll worm and square injury significantly below that of the untreated check.

A boll weevil infestation developed in the untreated

TABLE III.—MEAN PERCENTAGES OF COTTON SQUARES AND BOLLS INJURED BY BOLLWORMS DURING TREATMENT WITH VARIOUS LOW-VOLUME AERIAL SPRAYS

| Treatment and Dosage (pounds per acre) | Percent Injured Squares and Bolls | | | | | | | | |
|---|---|---|---|---|---|---|---|---|---|
|  | Days After Treatment | | | | | | | | |
|  | 0 | 5 | | 8 | | 12 | | 15 | |
|  | Squares | Squares | Small bolls | Squares | Small bolls | Small bolls | Large bolls | Small bolls | Large bolls |
| Randomized Block Test | | | | | | | | | |
| Toxaphene-DDT-Methyl Parathion (2-1-.5) (Conventional Standard) | 2.7 | 2.7 | 2.3 | 1.5 | 0.7 | 2.3 | 0.8 | 0.0 | 0.7 |
| Toxaphene-DDT-Methyl Parathion (2-1-.5) [1] | 2.3 | 4.8 | 3.8 | 4.0 | 3.5 | 1.0 | 1.3 | 0.7 | .2.0 |
| Strobane-DDT-Malathion (2-1-.5) [1] | 2.0 | 2.5 | 2.0 | 3.8 | 3.2 | 4.3 | 2.0 | 1.1 | 0.3 |
| Malathion (1.9) [2] | 2.7 | 3.8 | 3.8 | 2.5 | 5.0 | 2.0 | 1.3 | 1.7 | 1.3 |
| Unreplicated Trials (Same Field) | | | | | | | | | |
| Malathion-TDE (1-1) [3] | 7.0 | 2.5 | 2.5 | 1.5 | 1.0 | 2.5 | 4.5 | 2.0 | 3.0 |
| Azodrin (.6) [4] | --- | 10.5 | 6.0 | 4.0 | 2.5 | 2.5 | 3.5 | 4.0 | 0.0 |
| Unreplicated Trials (Adjacent Field) | | | | | | | | | |
| Methyl Parathion (1.0 to 1.5) [5] | 5.0 | 5.0 | 17.5 | 4.5 | 11.5 | 10.5 | 14.5 | 9.0 | 11.0 |

[1] 42 fluid ounces of a formulation containing 6.0, 3.0, and 1.5 pounds per gallon of the respective active ingredients.
[2] 24 fluid ounces of a 95 percent product.
[3] 32 fluid ounces of a formulation containing 4 pounds per gallon of each active ingredient.
[4] 16 fluid ounces of a 4.8 pound per gallon glycol formulation.
[5] 32 fluid ounces of 4.0 pound emulsifiable concentrate for first two applications, 24 fluid ounces of an 8 pound per gallon material thereafter.

TEST II

Technical malathion at 4.0 pound plus TDE at 4.0 pound per gallon of cyclohexanone applied as an ultra low-volume spray and Toxaphene at 2.4 pounds plus DDT at 1.2 pounds plus methyl parathion at 0.6 pound per acre applied as a conventional spray were compared in a field experiment conducted for control of the boll worm and boll weevil. Plots were 13 to 22 acres in size with 15 sub-plots in each treatment. Applications of insecticides were made with aerial equipment. The total volume of malathion plus TDE applied was 32 ounces check but remained at very low levels in the treated plots. There were significantly fewer punctured squares in each treatment than in the check. Each treatment produced a significant increase in yield over the check with no difference between treatments.

It is apparent that the malathion, TDE, cyclohexanone composition produces control of both boll worm and boll weevil virtually equal to the standard aqueous emulsion even when used at less than half the total dosage of toxicant per acre.

The illustrations of the method that constitutes the invention given above are not intended to limit the invention in any way but are merely descriptive of the method. All modifications which fall within the spirit of the present invention are claimed as part of the present invention.

We claim:

1. In the art of undiluted spray application of low volumes of cotton boll worm and boll weevil toxicants by means of aerial or ground-rig sprays of droplets of between about 50 microns and about 100 microns in size, applied from a height of not more than about 20 feet above the cotton plants, at rates between about 50 droplets and about 500 droplets per inch, the improvement which consists of the step of spraying cotton with a solution comprising 4/1 to 3/6 pounds of TDE [1,1-dichloro 2,2-bis(parachlorophenyl) ethane] malathion [O,O dimethyl phosphorodithioate of diethyl mercaptosuccinate] per gallon of a mixture of xylol and cyclohexanone where the concentration of the cyclohexanone in the xylol, cyclohexanone mixture may vary from 5–50%.

2. The process of claim 1 wherein the solution comprises 4/2 to 4/4 pounds of TDE/malathion per gallon of a mixture of xylol and cyclohexanone wherein the concentration of the cyclohexanone in the xylol, cyclohexanone mixture may vary from 8–25%.

3. The process of claim 2 wherein the solution is sprayed at the rate of 0.2–6.0 pounds of toxicant per acre in droplets in the size range of 50–100 microns.

4. The process of claim 3 wherein the solution is sprayed at the rate of 0.5–1.5 pounds of toxicant per acre.

5. In the art of undiluted spray application of low volumes of cotton boll worm and boll weevil toxicants by means of aerial or ground-rig sprays of droplets of between about 50 microns and about 100 microns in size, applied from a height of not more than about 20 feet above the cotton plants, at rates between about 50 droplets and about 500 droplets per inch, the improvement which consists of the step of spraying cotton with a solution comprising 3/1 to 2/4 pounds of TDE/malathion per gallon of xylol.

6. The process of claim 5 wherein the solution comprises 1/4 to 2/4 pounds of TDE/malathion per gallon of xylol.

7. The process of claim 6 wherein the solution is sprayed at the rate of 0.2–6.0 pounds of toxicant per acre in droplets in the size range of 50–100 microns.

8. The process of claim 7 wherein the solution is sprayed at the rate of 0.5–1.5 pounds of toxicant per acre.

9. In the art of undiluted spray application of low volumes of cotton boll worm and boll weevil toxicants by means of aerial or ground-rig sprays of droplets of between about 50 microns and about 100 microns in size, applied from a height of not more than about 20 feet above the cotton plants, at rates between about 50 droplets and about 500 droplets per inch, the improvement which consists of the step of spraying cotton with a solution comprising 3/1.5 to 4/4 pounds of TDE/malathion per gallon of cyclohexanone.

10. The process of claim 9 wherein the solution comprises 3/3 to 4/4 pounds of TDE/malathion per gallon of cyclohexanone.

11. The process of claim 10 wherein the solution is sprayed at the rate of 0.2–6.0 pounds of toxicant per acre in droplets in the size range of 50–100 microns.

12. The process of claim 10 wherein the solution is sprayed at the rate of 0.5–1.5 pounds of toxicant per acre.

13. A homogeneous solution comprising 4/1 to 3/6 pounds of TDE/malathion per gallon of a mixture of xylol and cyclohexanone in which the amount of cyclohexanone in the xylol, cyclohexanone mixture may vary from 8–25%.

14. A homogeneous solution comprising 3/1 to 2/4 pounds of TDE/malathion per gallon of xylol.

15. A homogeneous solution comprising 3/1.5 to 4/4 pounds of TDE/malathion per gallon of cyclohexanone.

References Cited

Burgess: J. Econ. Entomol., 58(3), 414–415, June 1965.
Thomas et al.: J. Econ. Entomol., 59(1), 114–116, February 1966.
Cleveland et al.: J. Econ. Entomol., 59(4), 973–976, August 1966.
Adair et al.: J. Econ. Entomol., 60(4), 1121–1127, August 1967.

SHEP K. ROSE, Primary Examiner

U.S. Cl. X.R.

424—354, 358